United States Patent [19]

Valyocsik

[11] 4,368,174
[45] Jan. 11, 1983

[54] APPARATUS FOR A CONTINUOUS DOWN-FLOW ZEOLITE PRODUCTION

[75] Inventor: Ernest W. Valyocsik, Yardley, Pa.

[73] Assignee: Mobil Oil Corporation, New York, N.Y.

[21] Appl. No.: 220,556

[22] Filed: Dec. 29, 1980

[51] Int. Cl.³ .......................................... F28D 21/00
[52] U.S. Cl. ............................. 422/208; 252/455 Z;
    366/279; 422/226; 422/242; 423/328
[58] Field of Search ............. 422/202, 205, 208, 225,
    422/226, 242; 423/328; 366/279; 252/455 Z

[56] References Cited

U.S. PATENT DOCUMENTS

| 2,882,243 | 4/1959 | Milton | 252/455 Z |
|---|---|---|---|
| 2,882,244 | 4/1959 | Milton | 252/455 Z |
| 2,926,182 | 2/1960 | Sutton | 260/413 |
| 3,130,007 | 4/1964 | Breck | 23/113 |
| 3,247,195 | 4/1966 | Kerr | 260/242 |
| 3,266,872 | 8/1966 | Terac et al. | 422/205 |
| 3,314,752 | 4/1967 | Kerr | 23/113 |
| 3,592,609 | 7/1971 | Honbo | 422/205 |
| 3,702,886 | 11/1972 | Argauer et al. | 423/328 |
| 3,709,979 | 1/1973 | Chu | 423/328 |
| 3,829,293 | 8/1974 | Waquier et al. | 422/254 |
| 3,832,449 | 8/1974 | Rosinski et al. | 423/328 |
| 3,972,983 | 8/1976 | Ciric | 423/328 |
| 4,016,245 | 4/1977 | Plank et al. | 423/328 |
| 4,046,859 | 9/1977 | Plank et al. | 423/328 |
| 4,076,842 | 2/1978 | Plank et al. | 423/328 |
| 4,097,242 | 6/1978 | Tsuto et al. | 422/208 X |
| 4,158,698 | 6/1979 | Geyer, Jr. et al. | 422/226 X |

FOREIGN PATENT DOCUMENTS 1246277  9/1971  United Kingdom ................ 422/253

OTHER PUBLICATIONS

Donald W. Breck, Zeolite Molecular Sieves, John Wiley & Sons, 1974, pp. 729–735.

Primary Examiner—Richard L. Chiesa
Attorney, Agent, or Firm—Charles A. Huggett; Michael G. Gilman; Stanislaus Aksman

[57] ABSTRACT

A down-flow apparatus for continuous crystallization of zeolites comprises a vertically-positioned reactor having at least one reactor inlet port at the top thereof and at least one product egress port at the bottom thereof. The reactor is equipped with an inside stirrer extending throughout the length of the reactor and with heating means surrounding the reactor. Product and spent liquids are collected into one or more product collectors at the bottom of the reactor wherein spent liquids are decanted from the crystalline product settling to the bottom. The entire assembly is pressurized with an inert gas, e.g., air, nitrogen, helium (He), to prevent water boiling at the reaction temperature.

9 Claims, 3 Drawing Figures

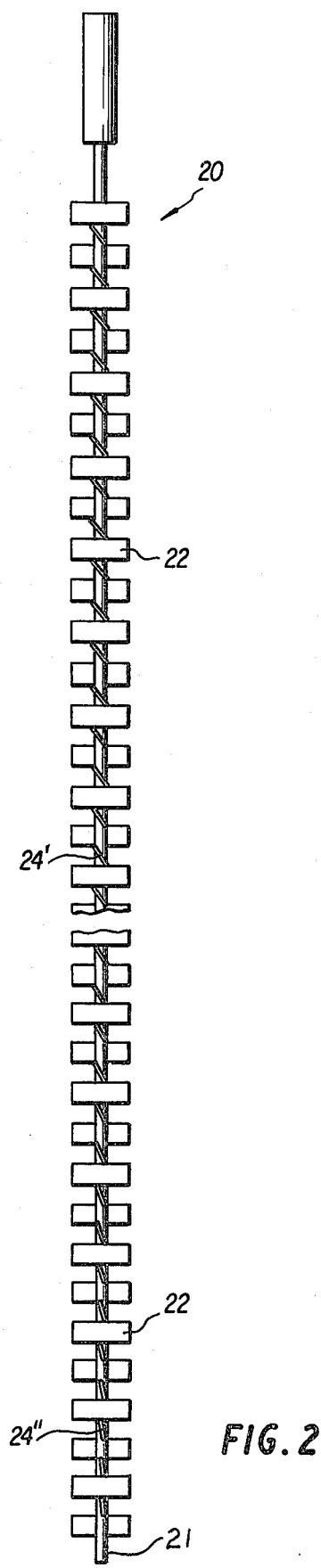
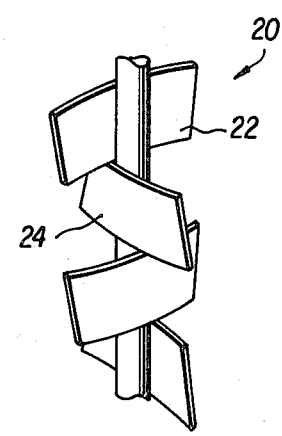
FIG. 2
FIG. 3

APPARATUS FOR A CONTINUOUS DOWN-FLOW ZEOLITE PRODUCTION

BACKGROUND OF THE INVENTION

1. Field of the Invention

This invention relates to an apparatus for a continuous production of alumino-silicate zeolites, and more particularly to an apparatus for a continuous down-flow zeolite production.

2. Description of the Prior Art

Zeolitic materials, both natural and synthetic, have been demonstrated in the past to have catalytic properties for various types of hydrocarbon conversions. Certain zeolitic materials are ordered, porous crystalline alumino-silicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline alumino-silicates. These alumino-silicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li, is equal to unity. One type of cation may often be exchanged either entirely or partially by another type of cation utilizing ion exchange techniques in a conventional manner. By means of such cation exchange, it has been possible to vary the properties of a given alumino-silicate by suitable selection of the cation. The spaces between the tetrahedra are usually occupied by molecules of water prior to dehydration.

Prior art techniques have resulted in the formation of a great variety of synthetic alumino-silicates. These alumino-silicates have come to be designated by letter or other convenient symbols, e.g., zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245) and zeolite ZSM-38 (U.S. Pat. No. 4,046,859), and zeolite ZSM-23 (U.S. Pat. No. 4,076,842).

Zeolite crystallization is commonly conducted batchwise in large autoclaves, either static or stirred. It frequently requires many hours for completion, and can be, by petroleum industry standards, labor-intensive. Manufacturing processes for commercial zeolites can be classified into two groups, those using homogeneous or heterogenous hydrogels and those based on pre-formed gels, for example, pelletized gels. The hydrogel processes conventionally employ large vats or autoclaves for stepwise mixing, gel aging and final crystallization, and several examples are reviewed in Chapter 9 of ZEOLITE MOLECULAR SIEVES by D. W. Breck, John Wiley and Sons, 1974. Although it is possible to crystallize some of these zeolites in a continuous-stream process (as claimed, for example, in Belgian Pat. No. 869,156, July 20, 1978), stepwise, batch processes were preferred in prior art because continuous crystallization processes had either not been demonstrated to apply to specific zeolite systems or had not been sufficiently developed.

The apparatus of the present invention is specifically adapted for synthesis of a class of zeolites characterized in their preparation by reaction mixtures of lower alkalinity and by a zeolite product of $SiO_2/Al_2O_3$ greater than 12. In addition, these zeolites have a constraint index of between 1 and 12, and they are generally prepared in the presence of a nitrogen (N) or phosphorus (P) containing organic compound. For a further description of that method and zeolites produced thereby on a continuous-stream basis, see copending U.S. Application Ser. No. 47,538, filed June 11, 1979, whose entire contents are incorporated herein by reference.

As will be seen from the above-noted copending U.S. application, the zeolite made by the present inventive apparatus are prepared at $OH/SiO_2$ mole ratios below 1.0 and often below 0.5. The combination of low $OH^-/SiO_2$ and highly siliceous reaction mixtures results in gels which are quite stiff and difficult to mix. It is with these reaction mixtures that a continuous-stream crystallization process affords unique advantages, both in terms of production efficiency and in terms of product quality control. Possible advantages of a continuous-stream process include facile and independent control of nucleation and of growth stages of crystal formation by such techniques as temperature and pH gradients, by staged injection of nutrients such as $SiO_2$ and $Al_2O_3$ source materials and of crystallization modifiers such as N- or P-containing organic compounds, alkali metal salts, acids and bases, and by seeding.

An up flow continuous flow zeolite crystallization apparatus for producing the aforementioned zeolites is disclosed in abandoned U.S. application Ser. No. 047,536, filed June 11, 1979 by L. D. Rollmann and E. W. Valyocsik. Although the Rollmann et al application briefly states that in the apparatus disclosed therein the liquid flow "may be either up or down", the detailed description of the apparatus is limited to the operation thereof with the liquid flowing in the upward direction. In addition, it will be obvious to those skilled in the art that the construction of the Rollmann et al apparatus is peculiarly adapted to the upflow mode of operation thereof and that the down-flow mode could not be carried out with the arrangement and the construction of the various apparatus parts as disclosed by Rollmann et al. For example, the stirrer of the Rollmann et al apparatus has blades disposed angularly about the vertical shaft of the stirrer at an angle of between 30 and 60 degrees from the vertical in the upward direction. The stirrer must perform two functions in the upflow reactor: (1) mixing action and (2) mechanical lifting action of the zeolite crystals against the natural settling tendency of the zeolite product so that the product crystals can be removed from the reactor.

In the upflow reactor the inlet tube for fresh nutrient fluids is in direct contact with the reacting liquids in the reactor at all times. Fresh nutrients entering the reactor must pass through a bed of precipitated zeolite crystals upon entering the reactor. This is a significant advantage in systems where seeding of the crystallization process is important. However, in systems wherein seeding is less important and the product crystals present an obstacle to the efficient flow of reactants into the reactor, it may be a disadvantage because it may result in the buildup of products and eventual plugging of the inlet tube.

Accordingly, it is the primary object of the present invention to provide an improved continuous flow crystallization apparatus operating in a down-flow mode.

It is an additional object of the present invention to provide a continuous down-flow reactor for the production of zeolites which produces zeolites at substantially improved yields and rates of production than conventional batch apparatus.

Additional objects will become apparent to those skilled in the art from the study of this specification and the appended claims.

SUMMARY OF THE INVENTION

The down-flow apparatus of the present invention comprises an elongated reactor vessel positioned substantially vertically, containing at least one entrance port for the continuous introduction of process reactants into the top portion of the reactor vessel. The reactor vessel also contains at least one exit port in the bottom portion thereof for continuous removal of crystalline zeolite product. A stirring means with a plurality of inclined blades is placed inside the reactor substantially through the entire length thereof. The stirring means, e.g., a stirrer, assures a continuous steady downward flow of the reactants in the vessel and prevents deposition of solids on the reactor thereby preventing plugging of the reactor. The reactor vessel is equipped with a heating means, e.g., a heating coil, to maintain the reactor at a desired crystallization temperature.

The crystalline zeolite product is removed at the bottom of the vessel into at least one, and preferably two, zeolite product collectors. Two product collectors can be employed so that the product stream can be switched between the product collectors in order not to interrupt the continuous flow from the reactor. The conduits from the reactor vessel to the product collectors are equipped with valves allowing one to isolate the product collectors from the reactor vessel. If two zeolite product collectors are employed, after the first zeolite product collector is substantially filled with zeolite product, the valve thereof is used to isolate it from the reactor vessel. Simultaneously, the valve to the second product collector is opened to direct the flow of zeolite thereinto. Accordingly, the continuous flow of product from the reactor is maintained substantially constant throughout the operation of the reactor. The apparatus also comprises spent liquids collectors, connected to the product(s) collectors, to collect byproduct spent liquids obtained during the crystallization reaction after the zeolite crystals have been separated by settling in the product collectors. A pressurized inert gas, e.g., helium, nitrogen, or air, assures pressurization of the reactor vessel to the desired pressure to avoid boiling of reaction mixture at elevated reaction temperature.

The apparatus of the present invention is not limited to synthesis of a single zeolite but can be used to continuously produce a wide range of zeolites, for example, ZSM-5, ZSM-11, ZSM-20, ZSM-35, ZSM-48.

BRIEF DESCRIPTION OF THE DRAWINGS

FIG. 2 is a view of a longitudinal cross-section of the stirrer.

FIG. 3 is a view of a top section of the stirrer.

DETAILED DESCRIPTION OF THE INVENTION

Figure 1:
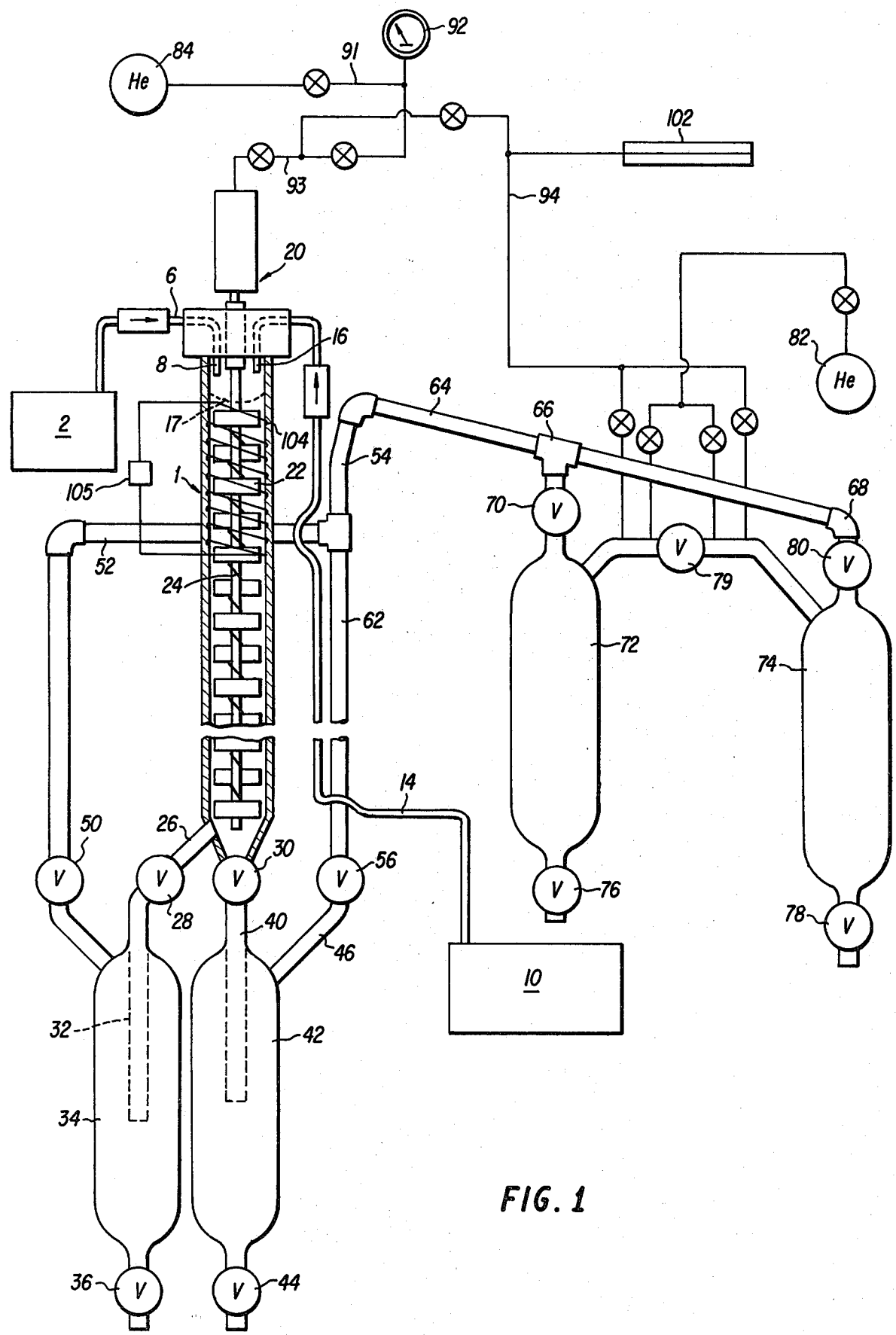
FIG. 1 is a schematic representation of the apparatus of the present invention.

The reactor is of a generally elongated shape, e.g., a tube, preferably cylindrical in shape, whose length and cross-sectional area depends on the desired throughput and on the product being synthesized in the reactor. The ratio of length of the reactor to its diameter is at least 3, preferably 4 to 36, most preferably 5 to 30.

The reactants, which will vary depending on the type of zeolite synthesized, are introduced into the reactor vessel through separate conduits, opening into the top portion of the reactor. For example, if it is desired to synthesize a crystalline zeolite of ZSM-5 family (described in detail in U.S. Pat. No. 3,702,886, the entire contents of which are incorporated herein by reference), a solution of silica, e.g., silica sol (30% colloidal silica in water), or a solution of commercially available sodium silicate (comprising a mixture of sodium silicate containing 27.8% $SiO_2$, 8.4% $Na_2O$ and 64% $H_2O$) is introduced into the reactor vessel through the first conduit, and a solution of nitrogen-containing ions and of alumina-containing ions, e.g., a basic solution of sodium aluminate and tetrapropylammonium bromide (TPA Br) or a solution of aluminum sulfate [$Al_2(SO_4)_3.16 H_2O$], containing 5% wt to 10% wt of tetrapropyl ammonium bromide (TPA Br) in water, is introduced into the reactor through the second conduit.

Alternatively, if it is desired to synthesize a high silica-alumina zeolite (e.g., high $SiO_2/Al_2O_3$ ratio ZSM-5, zeolite, e.g., having a $SiO_2/Al_2O_3$ ratio of 1000 to infinity), the reactants introduced into the reactor comprise substantially pure silica, having not more than 40 ppm of $Al_2O_3$ present as an impurity in the silica reactant, with no deliberately added alumina being present in the recipe. A solution of nitrogen-containing ions, e.g., TPA Br, is introdued into the reactor either through a separate second conduit or in admixture with the silica solution.

In a preferred embodiment, the reactor is positioned substantially vertically. The term substantially vertically as used herein designates such positioning of the reactor which forces the reactants and products to flow downwardly due to the force of gravity. Thus, the reactor may be positioned at 60° to 90° from the horizontal direction.

Additionally, with suitable modifications of the stirring and process control means, the reactor may also be positioned in a substantially horizontal direction.

The top portion of the reactor vessel is defined herein as the uppermost 33%, preferably 25%, and most preferably 10% of the length of the reactor. Direct contact of the feed solutions with the liquid reaction mixture is prevented by providing an inert gas atmosphere in the reactor. The lack of direct contact between the feed solutions and the reaction mixture substantially prevents plugging of the inlet conduits by the deposition of crystalline zeolite product thereon. The term inert gas is used herein designates any gas which does not react chemically with any of the process reactants or products thereof. Suitable inert gases are, e.g., helium, nitrogen, air, argon. The inert gas is preferably introduced into the reactor at a pressure of at least 1 atmosphere, preferably 10 to 35 atm, and most preferably 23 to 35 atm. The inert gas is introduced into the reactor through a valve-equipped conduit at the top portion of the reactor and discharged through a back-pressure valve (e.g., valve 102 in FIG. 1) preset to such a pressure that a constant gas pressure can be maintained in the apparatus. The inert gas pressurizes the entire apparatus assembly, including the reactor vessel, the zeolite product recovery vessels and the spent liquid collectors, to the same desired process pressure.

The reactor vessel is equipped with a heating means, e.g., a heating coil 104 surrounding the reactor, the operation of which is controlled by a control means 105. Thermocouples are inserted at distances of about 12 inches along the reactor length between the reactor wall and the heating coil. The thermocouples are connected to process controlling means, e.g., temperature controllers and digital temperature indicators. A stirring means, comprising an elongated rod, extending throughout the length of the reactor and having a plurality of blades, is placed inside the reactor vessel in such a manner that it extends substantially through the entire length of the reactor, thereby insuring the efficient mixing of the reactants, inducing the downward flow of the liquids in the reactor, and preventing the buildup of heavy solid deposits on the reactor walls. The blades are disposed angularly about the rod of the stirring means at between 0° to 60°, preferably 10° to 45°, and most preferably 30° to 45° from the vertical in a direction angular to the vertical orientation of the rod as depicted schematically in FIG. 2. The rod with the alternating blades is continuously rotated by conventional motor means, preferably placed outside the reactor vessel, during the course of the reaction.

The pH and composition can be controlled by feed rates from separate pumps. More careful control of pH can also be achieved with pH electrodes embedded directly into the reactor or by pumping premixed viscous aluminosilicate gel directly into the inlet of the reactor.

Residence time of the reactants in the reactor vessel varies and it depends on the reactants used and on the zeolite product which one desires to produce. For example, for ZSM-5 zeolite, residence time may vary from about one (1) hour to about five (5) hours, in each case yielding a very pure zeolite (about 95% crystallinity) at rates substantially greater than those achieved with batch processes.

The product of the reaction is recovered from the reactor vessel at the bottom portion of the reactor into a product collecting means or product collector, e.g., a stainless steel or glass cylinder connected to the reactor vessel by means of a conduit equipped with a valve means, e.g., a conventional ball valve. The valve allows one to isolate the reactor vessel from the product collecting means after the latter is substantially filled to capacity with the product of the reactor.

The bottom portion of the reactor vessel is defined herein as the lower 33%, preferably the lower 25% of the length of the reactor. It will be obvious to those skilled in the art that the exact positioning of the reactor egress means will vary for various products synthesized in the reactor means and that optimum positioning of the egress means can be easily determined by those skilled in the art on a case-by-case basis.

In a preferred embodiment, the apparatus contains at least two separate product collecting means, each connected to the reactor vessel by a conduit containing a separate valve means. When the first product collector is filled with the product to the desired degree, the valve in the conduit of that collector is closed, thereby isolating it from the reactor. Simultaneously, the valve of the second product collector is opened to direct the flow of product thereinto. Thus, the contents of the first collector can be removed, e.g., by a valve located at the opposite end of the collector than the inlet of the product thereinto, and this mode of operaton is continued until the second product collector is also substantially filled with the product, at which time the second collector is isolated and the product is directed into the first collector. The first collector must be refilled with liquid, e.g., water, and repressurized before being placed back on stream for further product collection.

The provision of at least two product collectors assures substantially uninterrupted, continuous flow of product from the reactor, thereby increasing yield and uniformity of the product. It will be apparent to those skilled in the art that the term "continuous" is not intended to limit the scope of the invention and that it encompasses the operation of the apparatus with periodic interruptions for diverting the flow of product from the first to the second product collectors and vice versa.

Spent liquids from the reaction mixture are also transferred to the product collectors, wherein they must be separated from the zeolite product. The separation is accomplished by allowing the heavier solid product to settle at the bottom of the product collectors, thereby forcing the lighter spent liquids to accummulate in the upper portion of the collectors. The spent liquids are then forced out of the upper portion of the product collectors by the continuously flowing stream of the product and of the spent liquids egressing from the reactor. The spent liquids are removed from the product collectors by a conduit leading to at least one, and preferably two or more, spent liquid collecting means or spent liquid collectors. This permits the apparatus to operate continuously for very long periods of time. The conduit removing the spent liquids from the product collectors to the spent liquid collectors can be positioned in any conventional manner. However, it is preferred to position the conduit in such a manner that it and the reactor form a U-tube vessel with the right arm (the conduit) of the U-tube being positioned somewhat below the point of egrees of the reactants in the left arm (the reactor) of the U-tube. This configuration of the U-tube assures that the level of the reaction mixture in the reactor is below the point of entry of the reactants into the reactor. Accordingly, there is no physical contact between the reactants inlet tubes and the reaction mixture, and, as a consequence, the possibility of the inlet tubes plugging with crystalline product deposits is substantially eliminated.

If more than one spent liquid collector is used, they may optionally be connected to each other by a valve-equipped conduit to allow excess liquid from one collector to be directed to a subsequent collector (or collectors). Similarly to product collectors, each of the spent liquid collectors is preferably equipped with a valve for isolating the respective collectors from the conduit carrying the spent liquids to the collectors, and with a separate valve for removing the spent liquids from the collectors after they become substantially filled to capacity with the spent liquids. In this connection, the term "substantially filled to capacity" as applied to the spent liquids collects and to the product collectors does not necessarily imply that the entire (100%) volume of the respective collectors must be fully occupied by the spent liquids and by the products, respectively. Rather, this term is used herein and in the appended claims to designate the filling of the respective collectors to 70% to 95%, preferably 85% to 95%, and most preferably 90% to 95% of their respective volumetric capacity. The exact optimum amount of liquid in the spent liquid collectors and of liquids with solid products in the product collectors can be readily determined by those skilled in the art from the preferred optimum operating conditions of the process.

The composite parts of the apparatus can be constructed from any commonly used construction materials which are inert to the reactants and to the products of the process. Thus, the reactor vessel can be made of high grade stainless steel, with inside walls of the reactor being polished to prevent deposition of solids thereon.

Alternatively, the inside reactor walls may be coated with teflon or with a similar resin also to prevent solids deposition. The stirrer of the reactor may also be made of stainless steel with blades welded thereto, or the blades and the stirrer may be made from a unitary block of material, e.g., cast from metal, or molded from plastic. The stirrer itself can be coated with teflon or with a resin or similar unreactive substance to prevent solids deposition on the stirrer. The spent liquids and the zeolite products collectors and all of the conduits can also be made of stainless steel, or similarly coated with unreactive material, e.g., teflon resin, to minimize chemical attack and/or solids deposition.

The entire apparatus assembly including the product and the spent liquid collectors, is pressurized with an inert gas, e.g., helium (He), nitrogen (N), to prevent water present in the reaction mixture from boiling at the reaction temperature (which could range from 100° C. to 300° C.). The pressure in the reactor must be maintained at at least 1 atmosphere (atm), preferably 10 atmospheres to 35 atmospheres, most preferably 23 to 35 atm, and it is preferred to use helium as the pressurizing gas because potential helium leaks can be relatively easily detected by means of a portable gas leak detector.

It will be obvious to those skilled in the art that any inert gas can be used to pressurize the reactor. Such suitable inert gases, besides He and N are air, argon, $CH_4$, CO, $CO_2$, $H_2$. The reactor assembly is pressurized in a manner well known to those skilled in the art by connecting a source of an inert gas, e.g., an outlet of an inert gas pump, connected to a supply of inert gas, to the reactor vessel. The inert gas fills the reactor vessel and the spent liquids collectors and, subsequently, the remaining parts of the apparatus, thereby establishing equilibrium process pressure in the entire apparatus assembly. The inert gas circuit may also contain a pressure gauge and an adjustable relief valve, the latter to prevent the pressure of the inert gas from exceeding a predetermined maximum reaction pressure. It will be obvious to those skilled in the art that both the relief pressure valve and all the other inert gas supply valves can be operated either manually or automatically by conventional automatic means.

The examples discussed below refer specifically to the crystallization of ZSM-5 in the present continuous down-flow apparatus, but it will be apparent to those skilled in the art that the apparatus of the present invention is not restricted only to the synthesis of this zeolite.

One of the embodiments of the present invention is described below with reference to FIG. 1. Prior to the initiation of the process, reactor 1 and product collectors 34, 42 are filled with distilled water to minimize solids deposition and reactor plugging as the system approaches equilibrium operating conditions. At that time the spent liquid collectors 72 and 74 contain no liquids. A source of silica, e.g., silica sol or Q-brand sodium silicate, is introduced into the reactor by a pump 2 through a conduit 6 and inlet nozzle 8. If the source of silica is silica sol (a solution of 30% colloidal silica in 70% of water), the source of nitrogen ions (in this instance, tetrapropyl ammonium bromide solution) must first be dissolved in an aqueous basic solution before it is added to the reactor. A basic solution is necessary in this instance to adjust the pH requirement necessary for the crystallization process. If the source of nitrogen ions in dry, powder state is added to dry, powder alkali, (e.g., sodium hydroxide) and water is added thereafter to the mixture, it has been found that the source of nitrogen ions is destroyed in a chemical reaction taking place between the sodium hydroxide and the quaternary salt (e.g., TPA Br) needed in the reaction. However, it has also been found that if sodium hydroxide is first dissolved in water to form an aqueous basic solution, the addition of the nitrogen ions (e.g., tetrapropyl ammonium bromide) to the aqueous basic solution does not destroy the source of nitrogen ions.

Conversely, if the source of silica is commercially available sodium silicate solution (comprising 27.8% $SiO_2$, 8.4% $Na_2O_4$, 64% $H_2O$), the source of nitrogen ions (e.g., tetrapropyl ammonium bromide) in dry powder form may be added directly to an acid solution which does not tend to destroy the source of nitrogen ions. Accordingly, no special precautions are necessary.

It will be obvious to those skilled in the art that respective reactants solutions may be premixed separately to their respective desired pH values outside of the reactor and then introduced into the reactor through a common mixing means, e.g., a mixing nozzle.

The rate of flow of the solution of silica is 30 ml/hr to 200 ml/hr, preferably 50 ml/hr to 100 ml/hr. A solution of aluminum ions [e.g. $Al_2(SO_4)_3.16H_2O$] and nitrogen ions, e.g., tetrapropyl ammonium bromide, is introduced into the reactor by a pump 10, and conduit 14 and inlet nozzle 16. The reactor, and the rest of the apparatus, is at that time pressurized with helium to a pressure of 500 psig by means of the source of helium 84 and conduits 91, 93 and 94. A pressure gauge 92 is used to monitor system pressure. At the same time, a stirrer 20 comprised of a number of alternating blades 22, 24 (FIGS. 2 and 3) supported by a longitudinal shaft 21, is continuously stirring the reaction mixture inside the reactor at an average speed of 250 rpm. The blades 22, 24 of the stirrer are placed axially at an angle of about 90° to each other. The blades, in the upper portion of the stirrer, e.g., blade 24', are inclined at a higher angle with respect to the shaft 21 than the blades in the lower portion of the stirrer, e.g., blade 24''. Such preferred positioning of the blades assures continuous movement of the products in a downward direction in the reactor.

A valve 30 of the crystalline zeolite collector 42 is opened, thereby allowing the product of the reaction to continuously flow into the product collector 42. At the same time, the valve 28 of the product collector 34 is closed, thereby preventing the product of the reaction from flowing into the product collector 34. The zeolite product collected in the product collector 42 settles at the bottom of the collector, while spent liquid is accumulated at the top. Due to fluid flow created by the pumping of fresh nutrients into the upper part of the reactor, spent liquid is forced to flow through a conduit 46, valve 56 and conduits 62 and 54 into a spent liquid conduit 64 and then into one or more of the spent liquid collectors 72 and 74. As shown in FIG. 1, conduit 62 and the reactor 1 form a U-tube vessel with the conduit 62 forming the right arm of the U-tube and the vessel 1 the left arm thereof. The right arm of the U-tube terminates at a vertical height below the discharge point of inlet nozzles 8 and 16 to assure that the nozzles do not come physically into contact with the upper edge 17 of the reactants mixture.

It will be obvious to those skilled in the art that valves 70 and 80 of the spent liquid collectors 72 and 74, respectively, can be opened automatically, or manually, for as long as it is desired to collect spent liquids in the collectors. For sake of simplicity, description of the process herein refers to the use of only one spent liquid collector. However, it will be obvious to those skilled in the art that a multiplicity of spent liquid collectors, e.g., collectors 72 and 74 with outlet valves 76 and 78, respectively, as shown in FIG. 1, may be used simultaneously in the operation of the apparatus. When the spent liquid collector 72 into which the spent liquid is directed has been filled substantially to its capacity, it can be isolated from the spent liquid conduit 64 by means of valves 70 and 79. Subsequently, a valve 76 at the bottom of the spent liquid collector can be opened and the liquid discharged therefrom into an appropriate waste receptacle. At the same time, the remaining waste liquid collector(s) can be utilized to receive spent liquid from the reactor. After emptying spent liquid collector 72, it must be re-pressurized to the apparatus pressure with gas from vessel 82 before valves 70 and 79 are again opened; otherwise, the difference in pressure created upon opening valve 70 or 79 would suddenly empty the contents of the reactor and product collectors into vessel 72.

Zeolite crystallinity in the solid product can vary from about 50% to about 100% and in the experiments conducted with the experimental apparatus summarized below, it varied from about 80 to 100%. The progress of the reaction can be monitored by any convenient means, e.g., by measuring the pH of the product slurry, the crystallinity of the recovered product, or by directly sampling the reactor contents to measure pH and zeolite content.

Recovery of the product from the reactor is accomplished by isolating the product collecting vessel which receives the product from the reactor 1 and subsequently redirecting the flow of the product into the second product collecting vessel. Thus, if the product from the reactor is originally directed into the vessel 42 in FIG. 1, this vessel can be isolated from the system by closing the valves 30 and 56. Then, a valve 44 at the bottom of the vessel is opened and the crystalline product is removed from the vessel 42 into an appropriate container. Simultaneously with the closing of the valve 30, a valve 28 is opened, thereby forcing the product from the reactor to flow into the product collecting vessel 34 through a conduit 26. A valve 36 at the bottom of the vessel 34 is closed at that time to prevent egress of the product from that vessel to outside of the system. It will be obvious to those skilled in the art that the closing and opening of the valves 28, 30, 36, 44, 50 an 56 can be accomplished either manually or automatically by means of a programmed valve opening and closing sequence which can be monitored, and controlled, e.g., by an appropriate computer. After removing the zeolite product from the product collectors 42 and 34 the collectors must be refilled with water and re-pressurized before being placed back on stream for further product collection.

The zeolite product is then recovered by filtering the slurry recovered from the reactor on a suction funnel. The filtered zeolite product is then treated in the standard manner well known in the art. For example, the zeolite product may be calcined, ion exchanged, impregnated with transition metal ions, composited with binder materials, such as alumina, extruded or spray-dried.

It will be apparent to those skilled in the art that the apparatus can be equipped with additional control and-/or safety equipment to optimize operation thereof and the yield of products.

It is believed that from the above description, one skilled in the art can readily carry out all of the embodiments of the present invention. Accordingly, the specific examples set forth below are merely illustrative and are not intended to limit the scope of the invention. All temperatures in the examples below are in degress centrigrade, all pressures in pounds per square inch of gas, and all percent proportions in percent by volume, unless otherwise indicated.

EXAMPLE 1

The apparatus of the present invention was used to synthesize high silica zeolite ZSM-5. The reactants used in this example were silica sol as the source of silica, sodium aluminate as the source of aluminum ions, and tetrapropyl ammonium bromide (TPA), as the source of nitrogen ions. The volume of the reactor used in this example was 496 milliliters (ml) when full (including the side arm to valve 28, FIG. 1), and its dimensions were: 2.54 cm inner diameter, 91.44 cm length. The mixture of the reactants was introduced into the reactor at such a rate as to arrive at the following mole ratios in the reactor:

| | |
|---|---|
| $SiO_2:Al_2O_3 =$ | 80 |
| $H_2O:SiO_2 =$ | 20 |
| $OH:SiO_2 =$ | 0.11 |
| $Na:SiO_2 =$ | 0.14 |
| $TPA:SiO_2 =$ | 0.09 |

The aforementioned ratio was kept substantially constant by monitoring the rate of introduction of silica (silica sol) and adjusting the rate of introduction of alumina/tetrapropyl ammonium bromide (TPA) solution at such a rate that the aforementioned ratios of the reactants were kept substantially constant. From these data liquid hourly space velocity (LHSV) of the reactants inside the reactor was calculated. In the above ratios, it is particularly important to maintain the ratio of the hydroxide ion to silica substantially constant at 0.11. If the amount of the hydroxide ions is too high, and therefore the solution too basic, the rate of ZSM-5 production slows down substantially. Conversely, if the solution is too acid, the rate of crystallization of ZSM-5 decreases substantially or, in extreme cases, no crystallization takes place.

Samples of the product were collected periodically from the product collecting vessel 42 by opening valve 44 at the bottom of the vessel by the procedure described above. The amount of the crystalline zeolite product synthesized was also measured with each sample collected from the bottom of the product collecting vessel. From that data, the rate of product crystallization in grams per hour, was calculated. The results of the experiment was summarized below in Table 1.

TABLE 1

| Sample No. | LHSV | Time On Stream (hrs) | $SiO_2$ Input g/hr | ZSM-5 Crystallinity* | Mass Collected grams | Rate of Production $\Delta M/\Delta t$ (g/hr) |
|---|---|---|---|---|---|---|
| 1 | 0.22 | 4.0 | 17.7 | 60% | 24.3 | 6.1 |
| 2 | " | 6.1 | 17.9 | 100% | 29.5 | 14.2 |
| 3 | " | 12.1 | 13.8 | 100% | 66.2 | 11.0 |
| 4 | " | 24.5 | 13.8 | 74% | 25.2 ⎫ | 6.8 |
| 5 | " | 24.5 | 13.8 | 84% | 56.6 ⎭ | |
| 6 | " | 27.1 | 16.0 | 3% | 13.2 | (5.0) |
| 7 | " | 32.1 | 19.8 | 77% | 76.0 | 15.2 |
| 8 | " | 43.6 | 14.1 | 100% | 46.2 ⎫ | 11.5 |
| 9 | " | 43.6 | 14.1 | 100% | 88.4 ⎭ | |
| 10 | " | 46.6 | 13.6 | 100% | 46.3 | 11.6 |
| 11 | " | 49.9 | 14.9 | 100% | 46.1 | 20.0 |
| 12 | 0.44 | 54.4 | 34.2 | 100% | 113.0 | 25.1 |
| 13 | " | 56.6 | 38.6 | 100% | 84.4 | 38.4 |
| 14 | " | 59.6 | 30.6 | 100% | 79.0 | 26.3 |

*Compared to a standardized reference sample of ZSM-5

During the 60 hour experiment, there was collected 748.1 grams of material in the product collecting tanks 34 and 42. At the same time, 1,019 grams of $SiO_2$ were pumped into the reactor and 599.1 grams of 100% crystalline ZSM-5 product were collected. The temperature in the reactor was 165° C. and the helium pressure 500 psig. The stirrer was operating at about 250 revolutions per minute (rpm). The low crystallinity of sample number 6 was due to apparatus breakdown (malfunctioning of sol pump). The data in Table 1 illustrates the recovery of the product crystallinity, in samples 7 and subsequent samples, following the startup after repair of the malfunctioning pump.

EXAMPLE 2

In this example high silica content ZSM-5 was also produced. The source of silica was also silica sol, and sodium aluminate and tetrapropyl ammonium bromide (TPABr) were used as the sources of aluminate and nitrogen ions, respectively. The reaction mixture composition mole ratios were:

| | |
|---|---|
| $SiO_2:Al_2O_3 =$ | Infinity |
| $H_2O:SiO_2 =$ | 20 |
| $OH:SiO_2 =$ | 0.07 |
| $Na:SiO_2 =$ | 0.07 |
| $TPA:SiO_2 =$ | 0.10 |

The product was sampled periodically, and the production rate of zeolite was measured. The crystallinity of the product was determined. From the pumping rates of the feed pumps the liquid hourly space velocity was calculated. In addition, the rates of introduction of the silica and basic aluminate-TPA+ solutions into the reactor were also monitored by conventional means, e.g., by calibrated burets.

The pH of the product slurry was also measured along with the other product parameters. This data is summarized below in Table 2.

TABLE 2

| Sample No. | LHSV | Time On Stream (hrs) | $SiO_2$ Introduction rate g/hr | ZSM-5 Crystallinity* | Product Collected (Grams) | $\Delta M/\Delta t$ (g/hr) | Product Slurry pH |
|---|---|---|---|---|---|---|---|
| 1 | 0.48 | 2.8 | 34.6 | 100% | 7.8 | 2.8 | 10.6 |
| 2 | 0.47 | 6.0 | 32.8 | " | 10.7 | 3.4 | 10.7 |
| 3 | 1.00 | 10.5 | 73.4 | " | 4.3 | 0.9 | 10.9 |
| 4 | 0.31 | 23.2 | 25.5 | " | 95.3 | 6.9 | 11.0 |
| 5 | 0.28 | 27.2 | 20.0 | " | 15.0 | 3.7 | 10.7 |
| 6 | 0.46 | 29.9 | 33.8 | " | 31.9 | 11.8 | 10.5 |
| 7 | 0.28 | 35.4 | 21.0 | " | 55.9 | 10.2 | 10.7 |
| 8 | 0.28 | 46.8 | 20.0 | " | 165.0 | 14.5 | 10.9 |
| 9 | 0.28 | 53.3 | 20.0 | " | 124.5 | 19.2 | 10.1 |
| 10 | 0.28 | 59.4 | 20.0 | " | 87.1 | 14.3 | 10.9 |
| 11 | 0.27 | 70.6 | 19.4 | " | 201.7 | 18.2 | 11.1 |
| 12 | 0.49 | 74.5 | 32.9 | " | 70.8 | 18.2 | 9.2 |
| 13 | 0.53 | 78.0 | 39.9 | " | 78.7 | 22.5 | 10.5 |
| 14 | 0.29 | 83.8 | 22.0 | " | 77.9 | 13.4 | 10.9 |
| 15 | 0.28 | 94.4 | 21.7 | " | 211.0 | 18.3 | 10.5 |
| 16 | 0.57 | 99.3 | 46.6 | " | 111.1 | 22.7 | 10.4 |
| 17 | 0.25 | 107.0 | 15.6 | " | 138.3 | 18.0 | 10.8 |

*Compared to a standardized reference sample of ZSM-5

The run was conducted for about 108 hours and during that time 1487 grams of 100% crystalline very high $SiO_2/Al_2O_3$ ZSM-5 was collected. The reactor was maintained throughout the run at 165° C. and 500 psig of helium pressure and the stirrer was rotated at the rate of about 250 rpm. After the experiment was completed, the reactor was disassembled and the inside thereof was examined. No deposits of solid material were observed on the inside walls of the reactor, nor on the stirrer.

It will be apparent to those skilled in the art that the above examples can be successfully repeated with ingredients equivalent to those generally or specifically set forth above and/or other variable process conditions.

From the foregoing description one skilled in the art can readily ascertain the essential features of this invention and without departing from the spirit and scope thereof can adapt it to various applications.

What is claimed is:

1. An apparatus for preparing crystalline zeolite materials on a continuous-stream basis comprising
    a substantially vertically-oriented reactor means,
    a stirring means inside said reactor means, said stirring means being operatively associated with said reactor means,
    a heating means surrounding said reactor means,
    at least one reactants entrance means in the upper portion of said reactor means for continuously introducing reactants into said reactor means,
    a product exit means in the lower portion of said reactor means for continuously removing crystalline zeolite product from said reactor means comprised of
    a first product exit means connected to a first crystalline zeolite product collecting means by a conduit containing a first valve means, and
    a second product exit means connected to a second crystalline zeolite product collecting means by a conduit containing a second valve means, and
    pressurizing means for pressurizing said reactor means with an inert gas.

2. An apparatus according to claim 1 wherein said at least one reactants entrance means comprises
    a first and a second reactants entrance means, said said reactants entrance means continuously conveying a source of silica into said reactor means, and said second reactants entrance means continuously conveying a source of alumina ions and a source of organic nitrogen or organic phosphorous compounds into said reactor means.

3. An apparatus according to claim 2 wherein said first and said second crystalline zeolite product collecting means are each connected to spent liquid collecting means.

4. An apparatus according to claim 3 wherein said pressurizing means is connected to the upper portion of said reactor means.

5. An apparatus according to claim 4 wherein said spent liquid collecting means comprises at least one spent liquid collecting vessel containing one ingress and one egress valve means.

6. An apparatus according to claim 5 wherein said stirring means extends substantially through the entire length of said reactor means.

7. An apparatus according to claim 6 wherein said stirring means comprises an elongated rod means having a plurality of blades angularly disposed about said rod means.

8. An apparatus according to claim 7 wherein said inert gas is helium.

9. An apparatus for preparing crystalline zeolite materials on a continuous stream basis comprising a substantially vertically-oriented reactor means, a stirring means inside said reactor means, said stirring means being operatively associated with said reactor means, said stirring means extending substantially through the entire length of said reactor means, said stirring means comprising an elongated rod means having a plurality of blades angularly disposed about said rod means, a first and a second reactants entrance means, said first reactants entrance means continuously conveying a source of silica into said reactor means, said second reactants entrance means continuously conveying a source of alumina ions and a source of organic nitrogen or organic phosphorous compounds into said reactor means, at least two product exit means in the lower portion of said reactor means for continuously removing crystalline zeolite product from said reactor means, each of said at least two product exit means connected to at least one crystalline zeolite product collecting means through at least one conduit means, each of said conduit means containing a valve means, said at least one crystalline zeolite product collecting means being connected to at least one spent liquid collecting means, a heating means surrounding said reactor means, and a pressurizing means for pressurizing said reactor means with an inert gas.

* * * * *

UNITED STATES PATENT AND TRADEMARK OFFICE
CERTIFICATE OF CORRECTION

PATENT NO. : 4,368,174
DATED : January 11, 1983
INVENTOR(S) : Ernest W. Valyocsik It is certified that error appears in the above—identified patent and that said Letters Patent is hereby corrected as shown below:

Column 12, line 64, before "pressurizing" insert -- a --.

Column 13, line 1, delete second occurrence of "said" and insert -- first --.

Signed and Sealed this

Twenty-fourth Day of May 1983

[SEAL]

Attest:

DONALD J. QUIGG

Attesting Officer     Acting Commissioner of Patents and Trademarks